US012637067B2

(12) United States Patent
An et al.

(10) Patent No.: US 12,637,067 B2
(45) Date of Patent: May 26, 2026

(54) AUTONOMOUS VEHICLE AND METHOD OF CONTROLLING

(71) Applicants: Hyundai Motor Company, Seoul (KR); Kia Corporation, Seoul (KR)

(72) Inventors: Tae Geun An, Yeongju-Si (KR); Dae Seok Jeon, Hwaseong-Si (KR); Dong Hyun Sung, Hwaseong-Si (KR); Yong Seok Kwon, Suwon-Si (KR); Sang Yeob Lee, Seoul (KR); Hyoung Jong Wi, Seoul (KR); Joon Ho Lee, Seoul (KR); Eung Seo Kim, Gwacheon-Si (KR); Sang Min Lee, Seoul (KR)

(73) Assignees: Hyundai Motor Company, Seoul (KR); Kian Corporation, Seoul (KR)

( * ) Notice: Subject to any disclaimer, the term of this patent is extended or adjusted under 35 U.S.C. 154(b) by 166 days.

(21) Appl. No.: 18/526,680

(22) Filed: Dec. 1, 2023

(65) Prior Publication Data
US 2024/0400042 A1     Dec. 5, 2024

(30) Foreign Application Priority Data

Jun. 2, 2023     (KR) ........................ 10-2023-0071672

(51) Int. Cl.
*B60W 30/09*     (2012.01)
*B60W 30/095*    (2012.01)
(Continued)

(52) U.S. Cl.
CPC ........ *B60W 30/09* (2013.01); *B60W 30/0956* (2013.01); *B60W 30/16* (2013.01);
(Continued)

(58) Field of Classification Search
CPC .. B60W 30/09; B60W 30/0956; B60W 30/16; B60W 30/182; B60W 60/0015;
(Continued)

(56) References Cited

U.S. PATENT DOCUMENTS 5,515,489 A * 5/1996 Yaeger ...................... G06T 7/00
                                                                    345/635
7,444,241 B2 10/2008 Grimm
(Continued)

FOREIGN PATENT DOCUMENTS

CN        113945224 A  *  1/2022  ......... G01C 21/3415
JP     2018-067102 A      4/2018
(Continued)

OTHER PUBLICATIONS

Translation of CN 113945224 A retrieved from Espacenet on Dec. 17, 2025 (Year: 2025).*

(Continued)

*Primary Examiner* — Fadey S. Jabr
*Assistant Examiner* — Faris Asim Shaikh
(74) *Attorney, Agent, or Firm* — Banner & Witcoff, Ltd.

(57)     ABSTRACT

An apparatus for controlling autonomous driving of a host vehicle is introduced. The apparatus may comprise a processor, and memory storing instructions, when executed by the processor, may cause the apparatus to receive sensor information from at least one of a plurality of sensors mounted on the host vehicle, determine, based on the sensor information, whether another vehicle, traveling within a threshold distance from the host vehicle, satisfies a target condition, based on the other vehicle satisfying the target condition, set the other vehicle as a target vehicle, determine an avoidance condition between the target vehicle and the host vehicle, and control, based on the avoidance condition, the autonomous driving of the host vehicle to operate in a first avoidance mode or in a second avoidance mode.

20 Claims, 11 Drawing Sheets

0%          100%
-7%
68%                                   100%

0%

- X Percent : -7%
- Y Percent : 68%

(51) Int. Cl.
   *B60W 30/16*        (2020.01)
   *B60W 30/182*      (2020.01)
   *B60W 60/00*        (2020.01)

(52) U.S. Cl.
   CPC ...... *B60W 30/182* (2013.01); *B60W 60/0015*
   (2020.02); *B60W 2554/80* (2020.02)

(58) Field of Classification Search
   CPC ..... B60W 2554/80; B60W 2554/4045; B60W
   40/04; B60W 60/0027; B60W 30/08;
   B60W 30/18109; B60W 60/0016; B60W
   2420/403; B60W 2420/408; B60Y
   2300/08
   See application file for complete search history.

(56)                 References Cited

U.S. PATENT DOCUMENTS

| | | | | |
|---|---|---|---|---|
| 11,299,147 | B2 * | 4/2022 | Kang | ............... B60W 60/0015 |
| 2003/0106732 | A1 * | 6/2003 | Watanabe | ................ B60T 7/22 |
| | | | | 180/169 |
| 2008/0172156 | A1 * | 7/2008 | Joh | ....................... G01S 13/723 |
| | | | | 701/45 |
| 2009/0237226 | A1 * | 9/2009 | Okita | ................. B60W 10/184 |
| | | | | 340/435 |

| | | | | |
|---|---|---|---|---|
| 2009/0326820 | A1 * | 12/2009 | Shimizu | .................... B60T 7/22 |
| | | | | 701/301 |
| 2013/0006513 | A1 * | 1/2013 | Nishiyama | ............ B60W 50/14 |
| | | | | 701/301 |
| 2019/0179006 | A1 * | 6/2019 | Baba | ...................... G06V 20/58 |
| 2019/0315345 | A1 | 10/2019 | Newman et al. | |
| 2020/0198699 | A1 * | 6/2020 | Lee | ...................... B62D 15/025 |
| 2021/0046927 | A1 * | 2/2021 | Miller | .............. B60W 30/0953 |
| 2021/0053562 | A1 * | 2/2021 | Li | ........................ G05D 1/0212 |
| 2021/0101588 | A1 * | 4/2021 | Pontisakos | ...... B60W 30/18154 |
| 2021/0122373 | A1 | 4/2021 | Dax | |
| 2021/0162991 | A1 | 6/2021 | Wang et al. | |
| 2022/0024475 | A1 | 1/2022 | Tzempetzis et al. | |
| 2023/0234576 | A1 * | 7/2023 | Jung | ................ B60W 30/0956 |

FOREIGN PATENT DOCUMENTS

| | | |
|---|---|---|
| JP | 2020-170278 A | 10/2020 |
| JP | 2021-105908 A | 7/2021 |

OTHER PUBLICATIONS

Multiobjective Optimization of Lane-Changing Strategy for Intelligent Vehicles in Complex Driving Environments (Year: 2020).*

* cited by examiner

AUTONOMOUS VEHICLE AND METHOD OF CONTROLLING

CROSS-REFERENCE TO RELATED APPLICATION

The present application claims priority to Korean Patent Application No. 10-2023-0071672, filed on Jun. 2, 2023, the entire contents of which is incorporated herein by reference in its entirety.

TECHNICAL FIELD

The present disclosure relates to an autonomous vehicle and a method for controlling the same.

BACKGROUND

A driving safety system may perform braking for a host vehicle based on a rear center point of a target vehicle driving in front of or around the host vehicle.

If the target vehicle is long, that is, a long target in length, and the braking is performed based on the rear of the long target, there may be a high likelihood of braking control being overly sensitive or controlling erroneously.

In addition or alternative, in the driving safety system, if there is no avoidable area for steering around a traveling path of the host vehicle, in the case of performing brakes at a control time, since a braking quantity may not be sufficient, there is a high likelihood of collision against the target vehicle.

SUMMARY

According to the present disclosure, an apparatus for controlling autonomous driving of a host vehicle, the apparatus may comprise: a processor, and memory storing instructions, when executed by the processor, may cause the apparatus to receive sensor information from at least one of a plurality of sensors mounted on the host vehicle, determine, based on the sensor information, whether another vehicle, traveling within a threshold distance from the host vehicle, satisfies a target condition, based on the other vehicle satisfying the target condition, set the other vehicle as a target vehicle, determine an avoidance condition between the target vehicle and the host vehicle, and control, based on the avoidance condition, the autonomous driving of the host vehicle to operate in a first avoidance mode or in a second avoidance mode.

The apparatus, wherein the instructions, when executed by the processor, may cause the apparatus to determine, based on a length of the other vehicle being longer than a reference length and based on a width of the other vehicle being wider than a reference width, that the target condition is satisfied. The apparatus, wherein the instructions, when executed by the processor, may cause the apparatus to calculate, based on the target condition being satisfied, an impact point between the host vehicle and the target vehicle, and determine, based on the calculated impact point, a collision type as a first collision type or a second collision type.

The apparatus, wherein the instructions, when executed by the processor, may cause the apparatus to determine the collision type as the first collision type based on the calculated impact point, on a X-axis, being within a lateral collision range of the target vehicle. The apparatus, wherein the instructions, when executed by the processor, may cause the apparatus to determine the collision type as the second collision type based on the calculated impact point, on a Y-axis, being within a lateral collision range of the target vehicle.

The apparatus, wherein the instructions, when executed by the processor, may cause the apparatus to calculate a collision index between the host vehicle and the target vehicle, wherein the collision index indicates a likelihood of a collision between the host vehicle and the target vehicle, and determine, based on the calculated collision index, whether the collision is more likely to occur. The apparatus, wherein the instructions, when executed by the processor, may cause the apparatus to determine that the collision is more likely to occur based on the calculated collision index being 1.

The apparatus, wherein the instructions, when executed by the processor, may cause the apparatus to determine that avoidance of a collision between the host vehicle and the target vehicle by steering is applicable based on the collision being less likely to occur, and set the autonomous driving of the host vehicle to the first avoidance mode based on the avoidance of the collision by the steering being applicable, or determine that the avoidance of the collision by the steering is inapplicable based on the collision being more likely to occur, and set the autonomous driving of the host vehicle to the second avoidance mode based on the avoidance of the collision by the steering being inapplicable.

The apparatus, wherein the instructions, when executed by the processor, may cause the apparatus to control, based on the first avoidance mode, the autonomous driving of the host vehicle to operate according to a basic function that does not require an additional deceleration quantity of the autonomous driving of the host vehicle. The apparatus, wherein the instructions, when executed by the processor, may cause the apparatus to control, based on the second avoidance mode, the autonomous driving of the host vehicle to operate according to an extended function capable of acquiring an additional deceleration quantity of the host vehicle.

According to the present disclosure, a method performed by a processor for controlling autonomous driving of a host vehicle, the method may comprise: receiving sensor information from at least one of a plurality of sensors mounted in the host vehicle, determining, based on the sensor information, whether another vehicle, driving within a threshold distance from the host vehicle, satisfies a target condition, based on the other vehicle satisfying the target condition, setting the other vehicle as a target vehicle, determining an avoidance condition between the target vehicle and the host vehicle, and controlling, based on the avoidance condition, the autonomous driving of the vehicle to operate in a first avoidance mode or a second avoidance mode.

The method may further comprise: based on a length of the other vehicle being longer than a reference length and based on a width of the other vehicle being wider than a reference width, determining that the target condition is satisfied. The method may further comprise: setting a collision type as a first collision type or a second collision type based on the target condition being satisfied and based on a calculated impact point between the host vehicle and the target vehicle.

The method may further comprise: setting the collision type as the first collision type based on the calculated impact point, on a X-axis, being within a lateral collision range of the target vehicle. The method may further comprise: setting the collision type as the second collision type based on the calculated impact point, on a Y-axis, being within a lateral collision range of the target vehicle. The method may further comprise: calculating a collision index between the host vehicle and the target vehicle, wherein the collision index indicates a likelihood of a collision between the host vehicle and the target vehicle, and determining, based on the calculated collision index, whether the collision is more likely to occur.

The method may further comprise: determining that the collision is more likely to occur based on the calculated collision index being 1. The method may further comprise: setting the autonomous driving of the host vehicle to the first avoidance mode based on determining that avoidance of a collision between the host vehicle and the target vehicle by steering is applicable based on the collision being less likely to occur, or the second avoidance mode based on determining that the avoidance of the collision by the steering is inapplicable based on the collision being more likely to occur.

The method may further comprise: controlling, based on the first avoidance mode, the autonomous driving of the host vehicle to operate according to a basic function that does not require an additional deceleration quantity of the host vehicle. The method may further comprise: controlling, based on the second avoidance mode, the autonomous driving of the host vehicle to operate according to an extended function capable of securing an additional deceleration quantity of the host vehicle.

DETAILED DESCRIPTION

Figure 1:
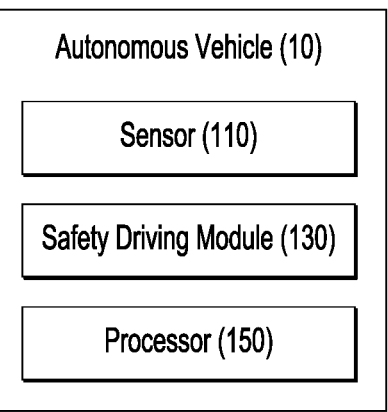
FIG. 1 shows an example of an autonomous vehicle according to an example of the present disclosure.

Hereinafter, examples of the present disclosure will be described in detail with reference to the accompanying drawings so that those skilled in the art to which the present disclosure pertains may easily implement the examples. However, the present disclosure may be implemented in various different forms and is not limited to the examples described herein. In order to clearly describe the present disclosure in the drawings, parts not related to the description are omitted, and similar parts are denoted by similar reference numerals throughout the specification.

Throughout the specification, if a part "includes" an element, this means that other elements may further be included without excluding other elements unless specifically stated otherwise. In addition or alternative, parts indicated with the same reference numerals throughout the specification refer to the same elements.

FIG. 1 shows an example of an autonomous vehicle according to an example of the present disclosure.

Referring to FIG. 1, an autonomous vehicle 10 according to an example of the present disclosure includes at least a sensor 110, a safety driving module 130, and a processor 150.

At least one sensor 110 is mounted on the autonomous vehicle 10. The sensor 110 is mounted on the autonomous vehicle 10, may obtain various sensor information about the periphery of the autonomous vehicle 10 while the autonomous vehicle 10 is driving, and may provide the obtained sensor information to the processor 150 or the safety driving module 130, which will be described later. Here, the sensor information may include various pieces of information between the driving other vehicles which are driving in the vicinity of the driving autonomous vehicle 10 (hereinafter, the autonomous vehicle will be referred to as a host vehicle 10 in the description). For example, the sensor information may include a distance between the host vehicle 10 and another vehicle, a relative speed of another vehicle, a position of another vehicle, obstacle, traffic light information, etc.

The sensor 110 may include a camera, a radar, a LiDAR, and a global positioning system (GPS). The sensor 110 may acquire at least a surrounding image of the host vehicle 10, a distance between the host vehicle 10 and another vehicle, a relative speed of another vehicle, a position of another vehicle, an obstacle, and a traffic light through a camera, a radar, and a LiDAR, and acquire a current position of the driver vehicle 10 through a GPS. However, it is not limited thereto.

The safety driving module 130 may generate a driving path (or a global path) for autonomous driving of the host vehicle 10 under the control of the processor 150. The safety driving module 130 controls autonomous driving based on the generated driving route under the control of the processor 150. For example, if inputting the destination, the safety driving module 130 may generate a driving route from the current location of the host vehicle 10 to the destination under the control of the processor 150 and control the host vehicle 10 to autonomously drive based on the generated driving route.

In this case, the safety driving module 130 may collect real-time traffic information obtained through a detailed map and/or wireless communication, driving information of the host vehicle 10, sensor information of the host vehicle 10, weather information, and the like, under the control of the processor 150, and quickly and accurately may generate a driving route updated in real time by analyzing various collected information.

Also, the safety driving module 130 may store a detailed map that can distinct lanes into the database. The detailed map may either automatically update every scheduled period through wireless communication or manually update by the user. For example, the memory may include at least a memory type of a flash memory, of a hard disk memory, of a microchip, of a card (e.g., a secure digital (SD) card or an eXtream digital (XD) card), etc., and at least a memory type of a Random Access Memory (RAM), of a Static RAM (SRAM), of a Read-Only Memory (ROM), of a Programmable ROM (PROM), of an Electrically Erasable PROM (EEPROM), of a Magnetic RAM (MRAM), of a magnetic disk, and of an optical disk.

The processor 150 may receive information about one or more sensors 110 from the plurality of sensors 110 mounted on the host vehicle 10, and may analyze other vehicles driving around the host vehicle 10 based on the information about the sensors 110. For example, the processor 150 may generate the sensor fusion track SFT around the host vehicle 10 or around the driving path by receiving sensor information from the plurality of sensors 110 mounted on the host vehicle 10 which is autonomously driving while following the generated driving path in real time.

The processor 150 may analyze the surrounding of the host vehicle 10 or another vehicle that is driving around the driving path or the surrounding obstacle of the host vehicle 10 based on the generated sensor fusion track SFT.

The processor 150 may set the sensor fusion track SFT as a target vehicle if the sensor fusion track SFT satisfies a predetermined target condition as a result analysis.

In addition or alternative, if the target vehicle is set, the processor 150 may calculate a collision point between the target vehicle and the host vehicle 10 based on the target vehicle. The processor 150 may determine the type of collision based on the calculated impact point.

In addition or alternative, the processor 150 may determine that the target vehicle has cuts-in if at least one collision index between the host vehicle 10 and the target vehicle satisfies all of the predetermined reference indices. A detailed example thereof will be described later.

Thereafter, the processor 150 may determine an avoidance condition between the predetermined target vehicle and the host vehicle 10, and control to operate in the first avoidance mode or the second avoidance mode in response to the determining result. This will be described later.

Figure 2:
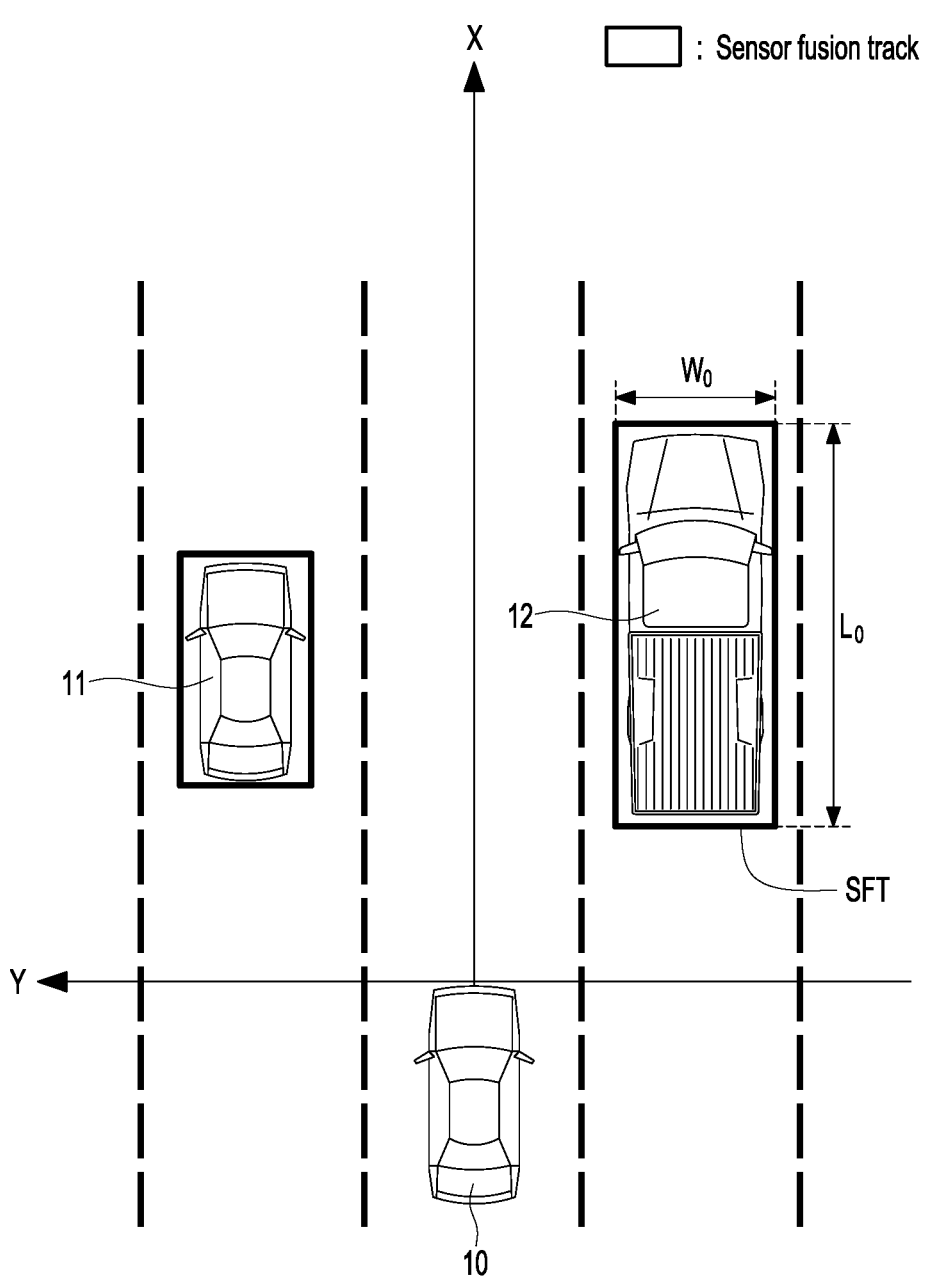
FIG. 2 shows an example of a target condition according to an example of the present disclosure.

Referring to FIG. 2, the processor 150 may calculate the area (or measuring the area's size, determining the size of the area, computing the area dimensions, or assessing the extent of the area, etc.) of the sensor fusion track SFT or the other vehicle quantity based on the sensor information collected on the driving route of the host vehicle 10 or the predicted driving route.

The target condition may include length information of the sensor fusion track SFT and width information of the sensor fusion track SFT. Here, the length information of the sensor fusion track SFT may be set based on a length of the vehicle, an X direction, or a direction where the vehicle travels. Further, the width information of the sensor fusion track SFT may be set based on the width of the vehicle, the Y direction, or the direction intersecting the direction where the vehicle travels.

If the result analysis shows that the length L0 of the sensor fusion track SFT is longer than the predetermined reference length Threshold2 of the sensor fusion track SFT and the width W0 of the sensor fusion track SFT is wider than the predetermined reference width Threshold1 of the sensor fusion track SFT, the processor 150 may determine that the predetermined target condition is satisfied and may set the sensor fusion track SFT as the target vehicle 11 based on a determining result.

Here, the predetermined reference length Threshold2 of the sensor fusion track SFT may be set to about 5 m, and the predetermined reference width Threshold1 of the sensor fusion track SFT may be set to about 2 m.

In other words, according to a result analysis, if the length L0 of the other vehicle is longer than the predetermined reference length Threshold2 of the other vehicle and the width W0 of the other vehicle is wider than the predetermined reference width Threshold1 of the other vehicle, the processor 150 may determine that the predetermined target condition is satisfied and may set the other vehicle as the target vehicle 11 based on the determining result.

For example, the processor 150 may set the size index S to "1" if both case of the length L0 of the other vehicle is longer than the predetermined reference length Threshold2 of the other vehicle and the case of width W0 of the other vehicle is wider than the predetermined reference width Threshold1 of the other vehicle are satisfied according to a result analysis.

Here, the target vehicle 11 may be defined as a vehicle having a longer length and a wider width than general vehicles. For example, the target vehicle 11 may include a trailer, a bus, a truck, and the like, which are long and wide vehicles.

Figure 3:
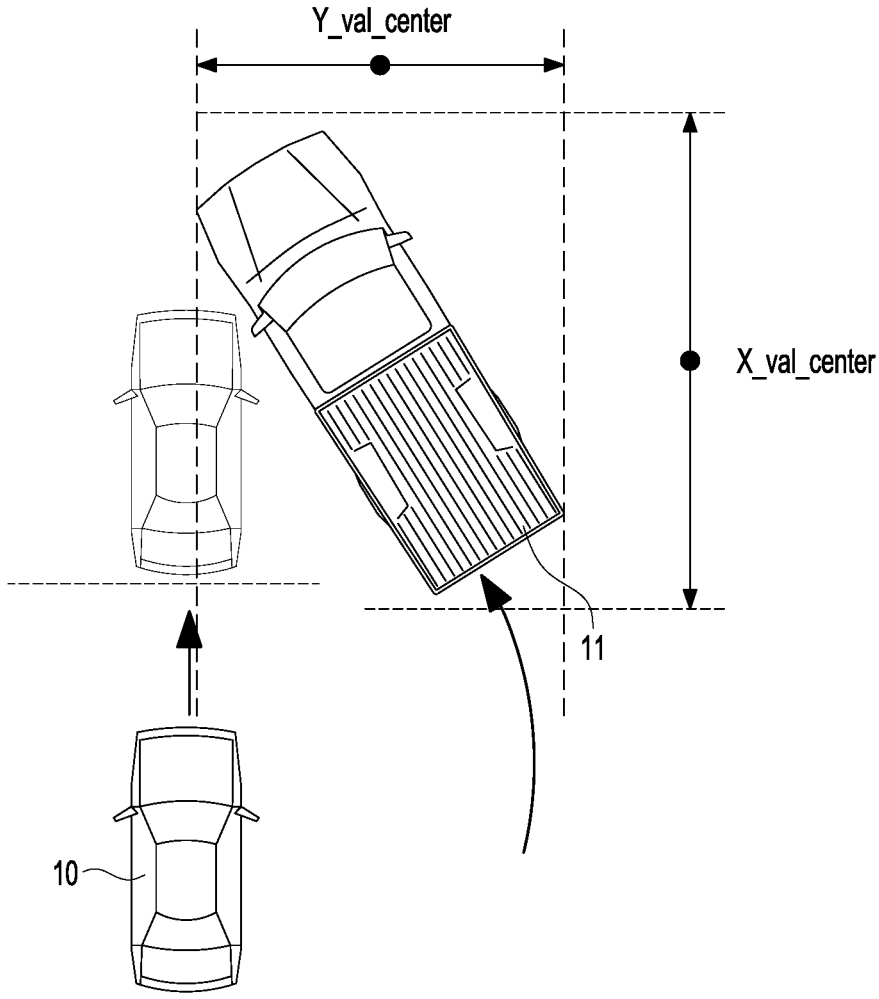
FIG. 3, FIG. 4, and FIG. 5 show examples of collision points according to an example of the present disclosure.

Referring to FIG. 3, the processor 150 may calculate the collision point between the host vehicle 10 and the determined target vehicle 11, and may set a type of collision based on the calculated collision point. The collision type may include a first type of collision and a second type of collision.

If it is predicted that the target vehicle 11 collides with the driving route or the predicted driving route of the host vehicle 10 at the time of cut-in, the processor 150 may change the control time based on the impact point, not the rear center of the target vehicle 11, at a value within a predetermined reference range by percentage (%) of the impact point based on the X-axis and the Y-axis during a state of collision.

Here, the collision point may be set using coordinates of four vertices of the target vehicle 11 with respect to the host vehicle 10. The four vertex coordinates may be determined to X-axis and Y-axis coordinates based on the X-axis coordinate that is the longitudinal direction of the host vehicle 10 and the Y-axis coordinate that is the transverse direction of the host vehicle 10. The collision point is also referred to as a coordinate of collision position. Here, the collision point is also referred to as an impact point.

For example, the maximum value of the X-axis may be a front bumper of the target vehicle 11, and the minimum value of the X-axis may be a rear bumper of the target vehicle 11. If the target vehicle 11 performs the cut-in from the right side of the host vehicle 10, the left value of the Y-axis (or the minimum value of the Y-axis) may be the front bumper of the target vehicle 11, and the right value of the Y-axis (or the maximum value of the Y-axis) may be the rear bumper of the target vehicle 11. On the other hand, if the target vehicle 11 cuts in (cut-in) from the right side of the host vehicle 10, the left value of the Y-axis (or the maximum value of the Y-axis) may be the rear bumper of the target vehicle 11, and the right value of the Y-axis (or the minimum value of the Y-axis) may be the front bumper of the target vehicle 11.

As illustrated in FIG. 3, the processor 150 may calculate an average value using a maximum value and a minimum value of each X-axis coordinate and Y-axis coordinate based on an impact point (or coordinates of collision position) between the host vehicle 10 and the target vehicle 11. An average value of the X axis may be expressed as X_val_center, and an average value of the Y axis may be expressed as Y_val_center.

As described above, calculating the average value, the processor 150 may quickly determine a collision point where the host vehicle 10 collides with the target vehicle 11, and may change the control time based on the collision point, not the rear center of the target vehicle 11.

For example, if the impact point at which the collision point between the target vehicle 11 and the host vehicle 10 is calculated based on the X-axis meeting the lateral collision determining range (Threshold3) of the target vehicle 11, the processor 150 may set to the first type of collision.

On the other hand, if the impact point at which the collision point between the target vehicle 11 and the host vehicle is calculated based on the Y-axis meeting the lateral collision determining range (Threshold4) of the target vehicle 11, the processor 150 may set to the second type of collision.

In addition or alternative, the processor 150 may set the impact index (index I) to "1" if the impact point, which is calculated from the collision point between the target vehicle 11 and the host vehicle 10 based on the X-axis satisfies the lateral collision determining range (Threshold3) of the target vehicle 11 and if the impact point, which is calculated from the collision point between the target vehicle 11 and the host vehicle 10 based on the Y-axis, satisfies the lateral collision determining range (Threshold4) of the target vehicle 11.

Figure 4:
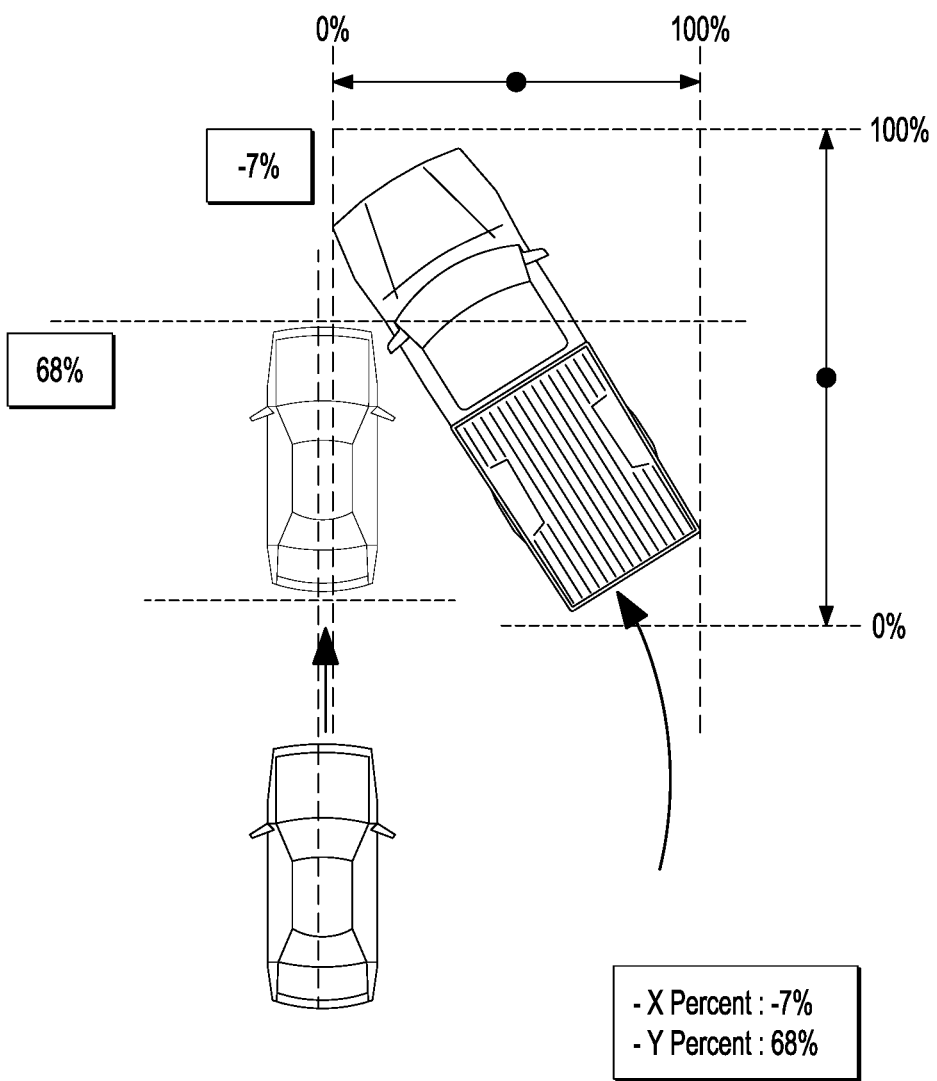

The first type of collision may be a type that collides against the side of the target vehicle 11 with respect to the front bumper of the host vehicle 10 as illustrated in FIG. 4. In this case, the collision point is expressed as an impact point that is minus (−) 7% on the X-axis and plus (+) 68% on the Y-axis.

Figure 5:
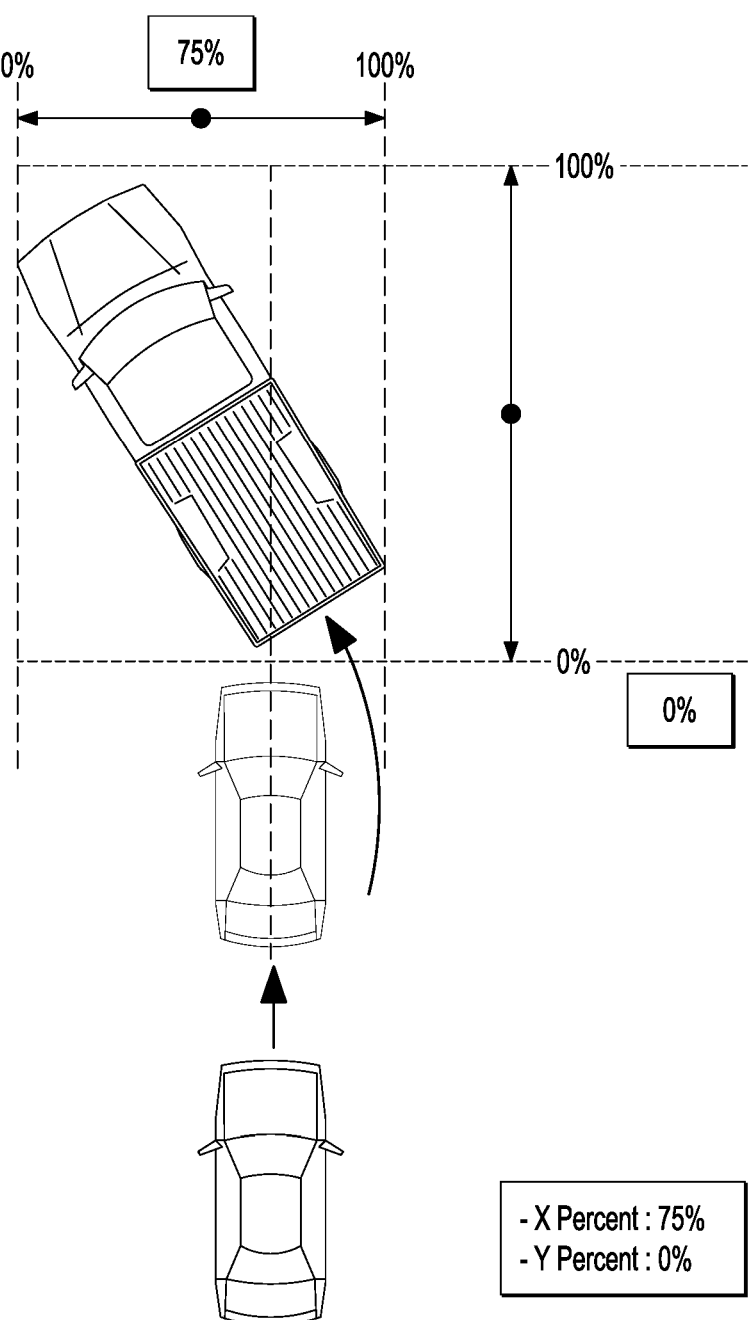

In addition or alternative, the second type of collision may be a type that collides with the rear of the target vehicle 11 with respect to the front bumper of the host vehicle 10 as illustrated in FIG. 5. In this case, the collision point is expressed as an impact point that is plus (+) 75% based on the X-axis and 0% based on the Y-axis.

Figure 6:
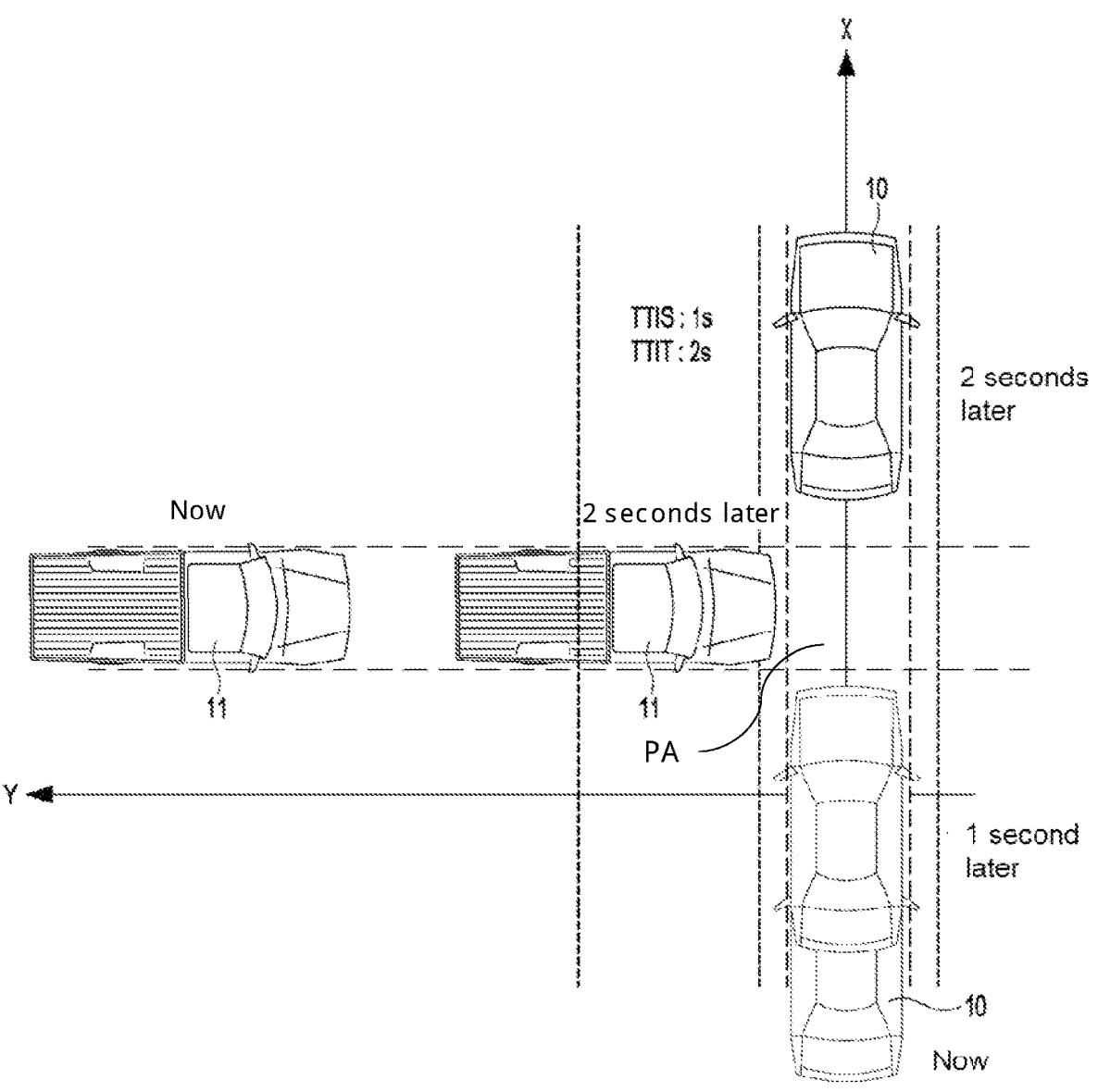
FIG. 6 shows an example of a collision index according to an example of the present disclosure.

Referring to FIG. 6, the processor 150 may calculate at least one collision index between the host vehicle 10 and the target vehicle 11 and may determine whether the target vehicle 11 has cut-in based on the calculated collision index.

The processor 150 may calculate at least one collision index between the host vehicle 10 and the target vehicle 11 and may determine the cut-in by the target vehicle 11 if at least one calculated collision index is equal to or less than each predetermined reference index.

For example, at least one collision index may include a first collision index, a second collision index, and a third collision index.

The first collision index may be defined as a time taken until four points of the host vehicle 10 (or four vertex coordinates of the host vehicle 10) enter a path area PA of target vehicle 11. The first collision index is also referred to as TTIS. For example, if the first collision index between the host vehicle 10 and the target vehicle 11 is equal to or less than the set first reference index (Threshold5), the processor 150 may determine that the target vehicle 11 has cut-in.

The second collision index may be defined as a time taken until four points of the target vehicle 11 (or four vertex coordinates of the target vehicle 11) enter the lane of the host vehicle 10. The second collision index is also referred to as TTIT. For example, if the second collision index between the host vehicle 10 and the target vehicle 11 is equal to or less than the second reference index (Threshold6), the processor 150 may determine that the target vehicle 11 has cut-in.

If the collision between the host vehicle 10 and the target vehicle 11 is predicted, the third collision index may be defined as a time taken until the collision occurs. The third collision index is also referred to as TTC. For example, the processor 150 may determine the cut-in of the target vehicle 11 if the third collision index between the host vehicle 10 and the target vehicle 11 is equal to or less than the set third reference index (Threshold7).

For example, the processor 150 may determine that the target vehicle 11 has cut-in and set the collision index C to "1", if the first collision index between the host vehicle 10 and the target vehicle is lower than the set first reference index (Threshold 5), if the second collision index between the host vehicle 10 and the target vehicle 11 is lower than the set second reference index (Threshold6), and if the third collision index between the host vehicle 10 and the target vehicle 11 is lower than the set third reference index (Threshold7) have all been satisfied.

Here, the indexes from the first reference index to the third reference index each may have different values. It is not limited thereto, and in some cases, the indexes from the first reference index to the third reference index may have the same value.

Figure 7:
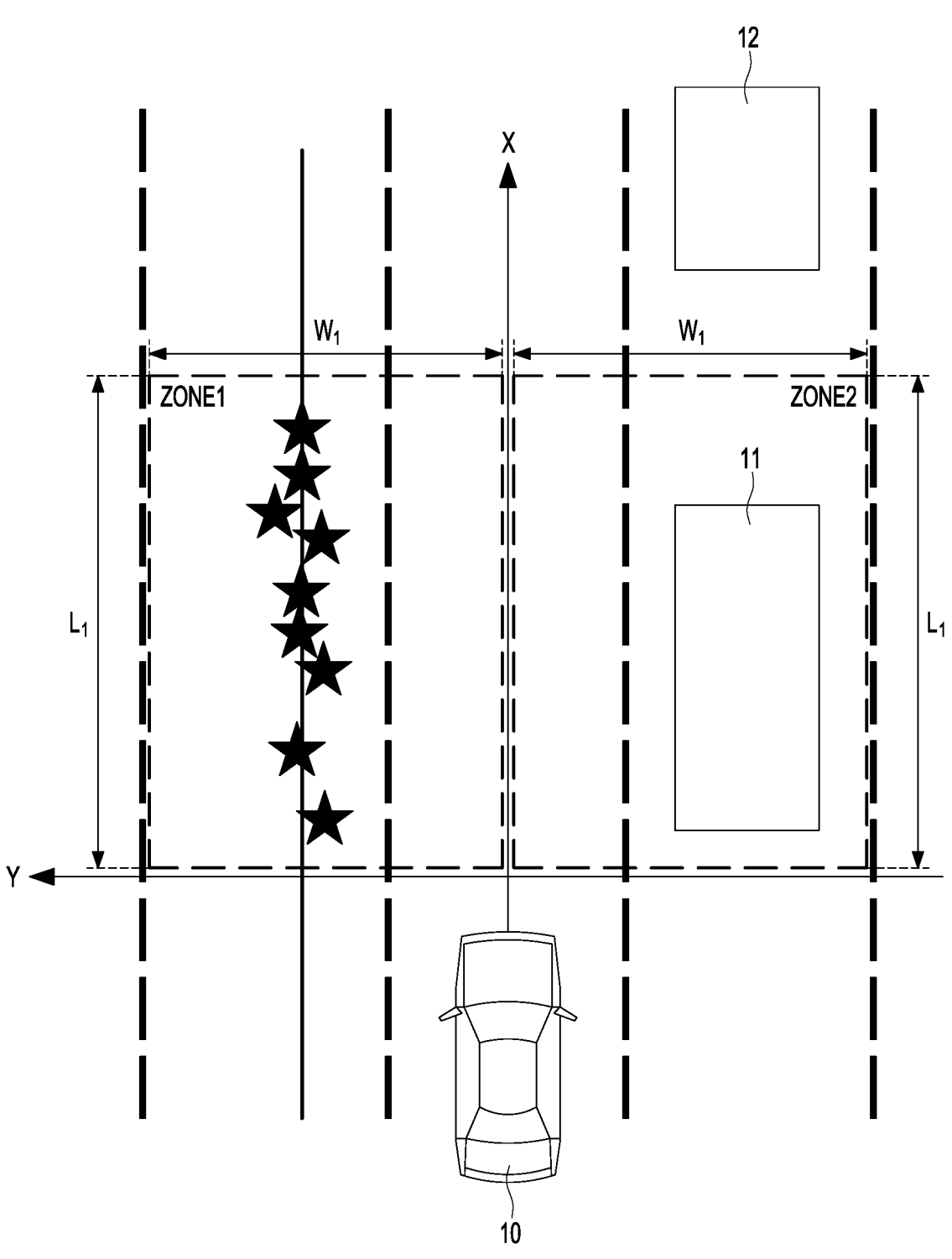
FIG. 7 shows an example of a possibility of avoidance according to an example of the present disclosure.
Figure 8:
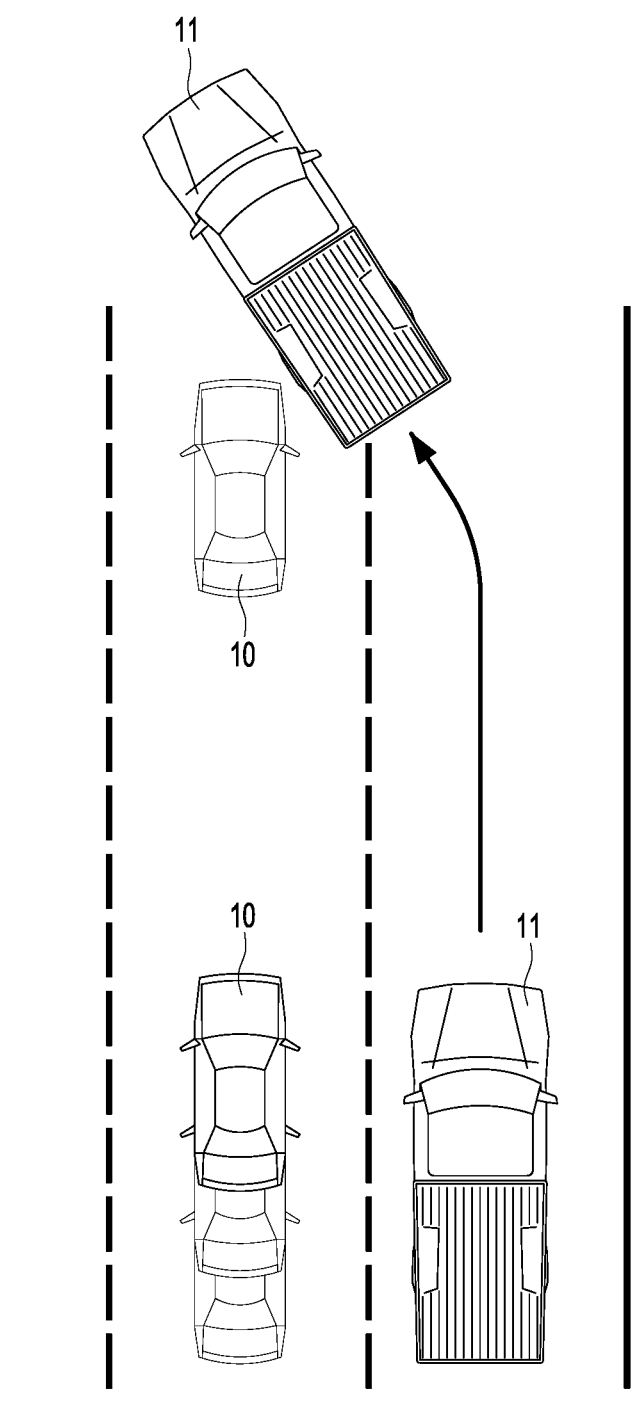
FIG. 8 shows an example of a first avoidance mode according to an example of the present disclosure.
Figure 9:
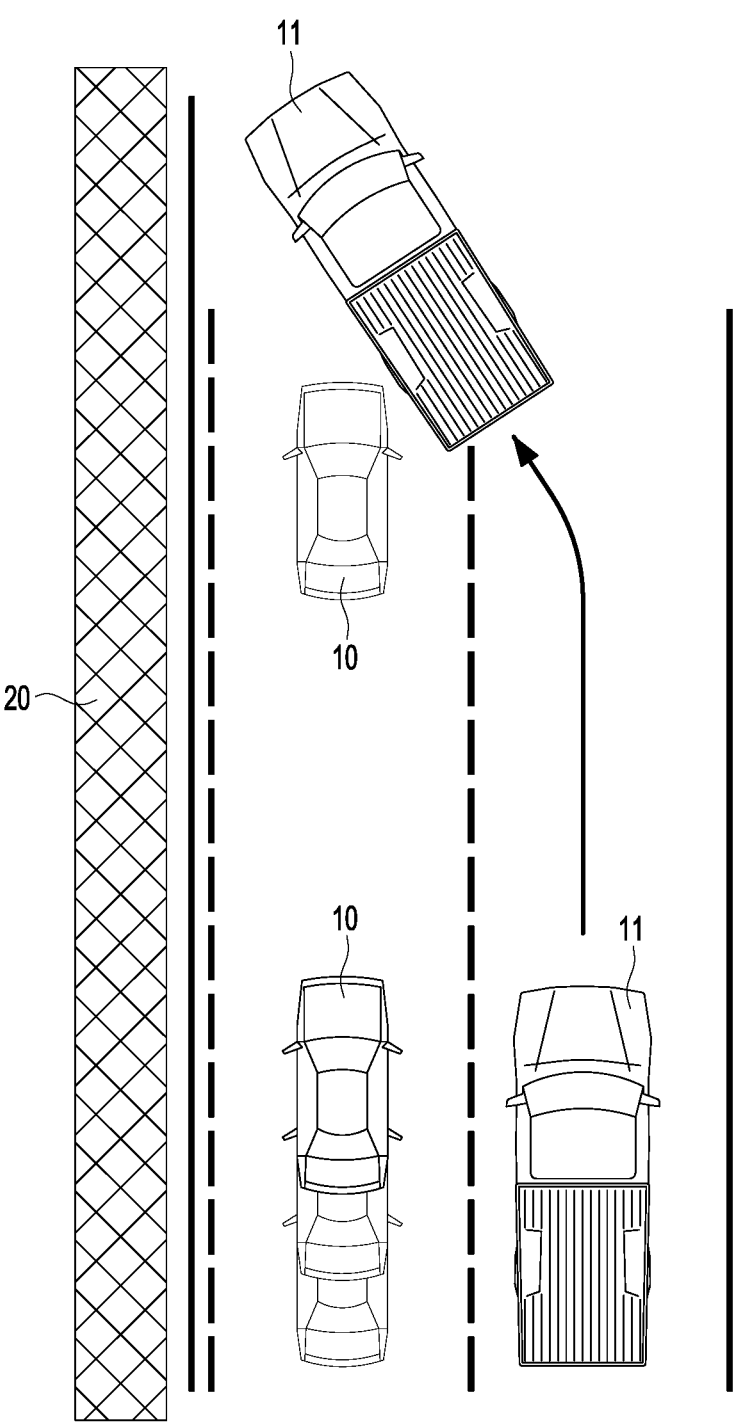
FIGS. 9 and 10 show examples of the second avoidance mode according to an example of the present disclosure.
Figure 10:
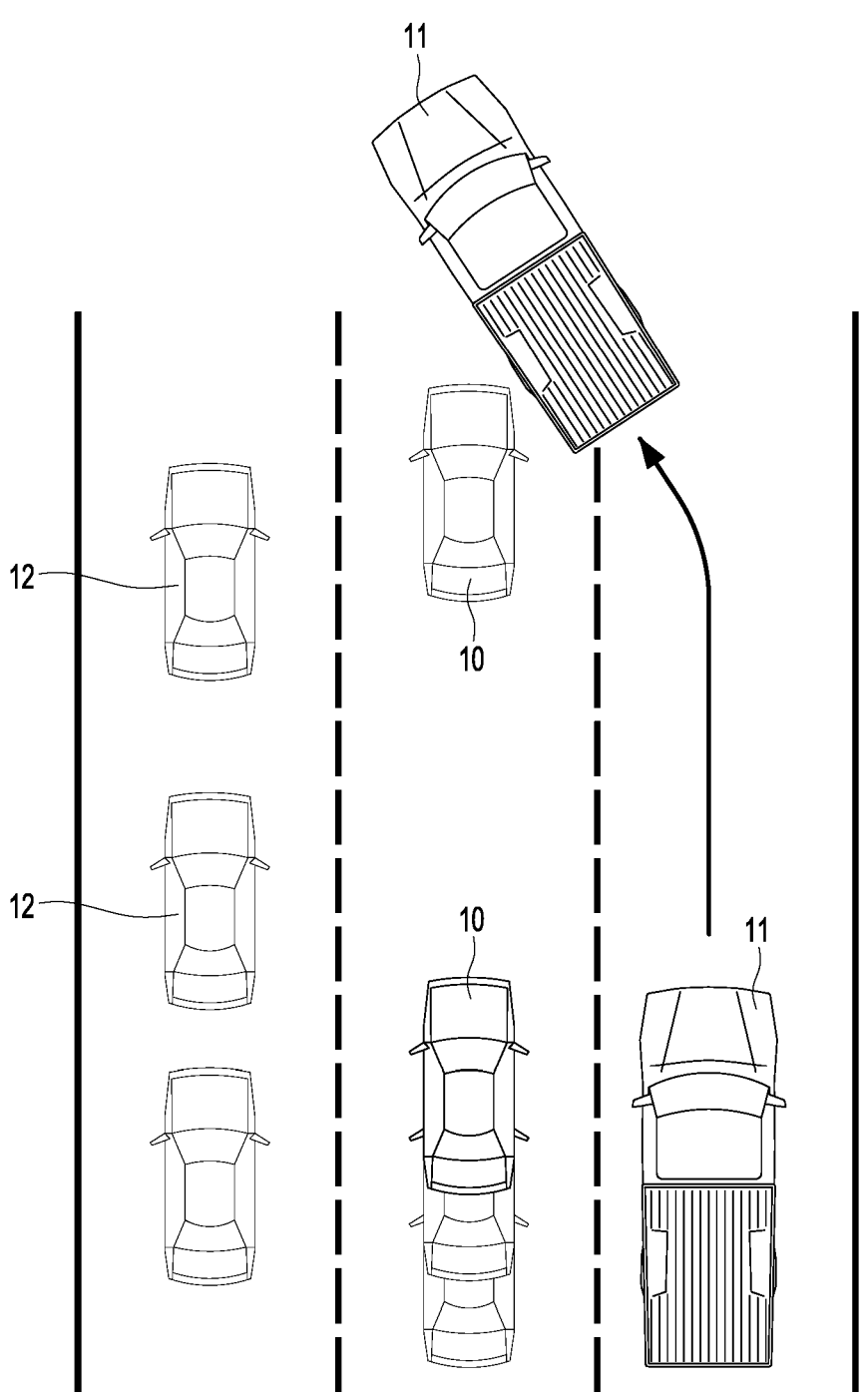

FIG. 7 shows an example of a possibility of avoidance according to an example of the present disclosure. FIG. 8 is a drawing for explaining a first avoidance mode according to an example of the present disclosure, and FIGS. 9 and 10 show examples of a second avoidance mode according to an example of the present disclosure.

Referring to FIG. 7, the processor 150 may determine whether avoidance is possible based on sensor information collected from a driving route or from a predicted driving route of the host vehicle 10.

The processor 150 may analyze the sensor information collected from the driving route or the predicted driving route of the host vehicle 10 and may determine the avoidance condition based on the result analysis.

The processor 150 may control to operate in the first avoidance mode or the second avoidance mode according to the determined result of the avoidance condition.

For example, if the risk of collision is less likely to occur as the determining result of the avoidance condition, the processor 150 may determine that steering avoidance is possible or applicable and controls to operate in the first avoidance mode.

Unlike this, if the risk of collision is highly likely to occur as the determining result of the avoidance condition, the processor 150 may determine that steering avoidance is impossible or inapplicable and controls to operate in the second avoidance mode.

The second avoidance mode may be operated as an extended function by securing an additional deceleration quantity in a situation where steering avoidance is impossible or inapplicable.

Here, as illustrated in FIG. 7, the avoidance condition may be determined by generating an area having a predetermined width on both sides of the driving route or the predicted driving route of the host vehicle 10 and by determining whether there is a steering avoidance possible area where a risk of collision can occur.

Referring to FIGS. 7 and 8, the processor 150 may determine that the steering avoidance is possible if the area for avoiding steering exists setting it into the first avoidance mode and may determine that the steering avoidance is impossible or impractical if the area for avoiding does not exist due to guardrail 20 or due to another vehicle 12, setting it into the second avoidance mode.

In the case of the first avoidance mode, the processor 150 may operate as a basic function that may not secure an additional deceleration quantity of the host vehicle 10. For example, in the case of the first avoidance mode, the processor 150 may control the maximum braking control quantity where the basic function operation may be −9.8 $m/s^2$ and the maximum deceleration quantity may be 80 km/h. In the first avoidance mode, the processor 150 may set an avoidance index (Index A) as "0".

Referring to FIGS. 7, 9, and 10, in the second avoidance mode, the processor 150 may operate as an extended function capable of securing an additional deceleration quantity of the host vehicle 10. In this case, the maximum deceleration quantity may be increased by a predetermined rate. For example, in the first avoidance mode, the processor 150 may perform an extended function operation. The extended function operation may increase the maximum deceleration quantity by about 25% compared to the basic function operation. For example, in the extended function operation, the maximum braking control quantity may be $-9.8$ m/s$^2$, and the maximum deceleration quantity may be 10 km/h. In the second avoidance mode, the processor 150 may set an avoidance index (Index A) as "1".

In more detail, the processor 150 may generate a region having a predetermined width on both sides of the driving route or the predicted driving route of the host vehicle 10 and may determine whether steering avoidance is impossible or impractical if at least a plurality of avoidance conditions are satisfied in the generated region.

As shown in FIG. 7, the host vehicle 10 may detect a plurality of front radar tracks (star shape in FIG. 8) generated on the guardrail 20 installed on the left side of the host vehicle 10 through the sensor information collected from the driving route or the predicted driving route of the host vehicle 10 under the control of the processor 150. In this case, the processor 150 may determine that the steering wheel may not be avoided according to at least one avoidance condition that is a criterion for determining the guardrail 20.

For example, the processor 150 may determine if steering avoidance is not possible or practical if the number of front radar tracks in the region is greater than the first avoidance condition (Threshold8), the predetermined longitudinal distance distribution of the front radar tracks is greater than the second avoidance condition (Threshold9), and the predetermined lateral distance distribution of the front radar tracks is greater than the third avoidance condition (Threshold10).

For example, the processor 150, under the control of the processor 150, may determine that the steering avoidance is impossible or impractical if the sensor fusion track SFT exists on both sides of the host vehicle 10 through the sensor information collected on the driving route or the predicted driving route of the host vehicle 10.

As illustrated in FIGS. 9 and 10, if the above-described guardrail 20 is present on both the driving routes or the predicted driving routes of the host vehicle 10 or if a long vehicle is driving, the processor 150 may set into the second avoidance mode and may secure an additional deceleration quantity in advance, thereby performing earlier control.

Figure 11:
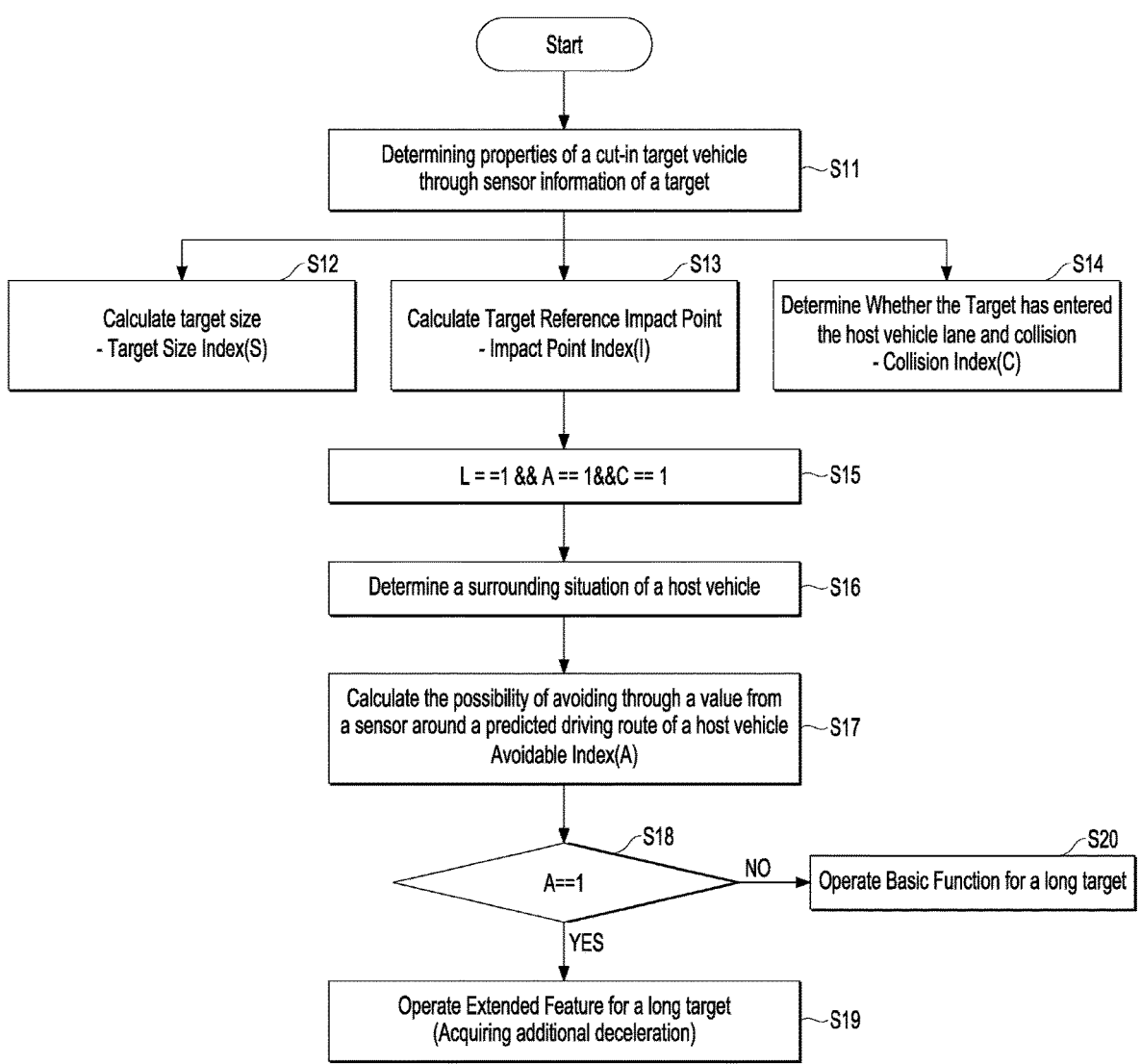
FIG. 11 shows an example of a control method of an autonomous vehicle according to an example of the present disclosure.

FIG. 11 shows an example of a method of controlling the autonomous vehicle 10 according to an example of the present disclosure.

Referring to FIG. 11, a control method of an autonomous vehicle according to an example of the present disclosure is as followed.

The host vehicle 10 may receive information on at least one sensor 110 from the plurality of sensors 110 under the control of the processor 150 and may determine the attribute of the target vehicle driving around the host vehicle 10 based on the information from the sensor 110 (S11).

For example, the host vehicle 10 under the control of the processor 150 may set the fusion track of the sensor 110 as a target vehicle, if the sensor fusion track satisfies a predetermined target condition.

The host vehicle 10 under the control of the processor 150 may calculate the region (or size, size, etc.) of the sensor fusion track SFT or the other vehicle based on the sensor information collected on the driving route or the predicted driving route of the host vehicle 10 (S12). This has been fully described above, and thus a description thereof will be omitted.

The host vehicle 10 under the control of the processor 150 may set the size index S to "1" if the length L0 of the other vehicle is longer than the predetermined reference length Threshold2 of the other vehicle, and the width W0 of the other vehicle is wider than the predetermined reference width Threshold1 of the other vehicle.

The host vehicle 10 under the control of the processor 150 may calculate an impact point between the host vehicle 10 and the determined target vehicle 11 (S13). This has been fully described above, and thus a description thereof will be omitted.

The host vehicle 10 under the control of the processor 150 may set the impact index I to "1" if the impact point which is calculated from the collision point between the target vehicle 11 and the host vehicle 10 based on the X-axis, satisfies the lateral collision determining range of the target vehicle 11 (Threshold3) and the impact point, which is calculated from the collision point between the target vehicle 11 and the host vehicle 10 based on the Y-axis, satisfies the lateral collision determining range of the target vehicle 11 (Threshold4).

The host vehicle 10 under the control of the processor 150 may determine the target vehicle 11 as the cut-in, if at least one collision index between the host vehicle 10 and the target vehicle 11 is equal to or less than each predetermined reference index (S14). This has been fully described above, and thus a description thereof will be omitted.

The host vehicle 10 may determine to cut-in the target vehicle 11 under the control of the processor 150 if the first collision index between the host vehicle 10 and the target vehicle 11 is equal to or less than the set first reference index (Threshold5), the second collision index between the host vehicle 10 and the target vehicle 11 is equal to or less than the set second reference index (Threshold6), and the third collision index between the host vehicle 10 and the target vehicle 11 is equal to or less than the set third reference index (Threshold7) are satisfied. For example, the host vehicle 10 under the control of the processor 150 may determine that the target vehicle 11 is cut-in and sets the collision index (index C) to "1", if all three collision indexes are satisfied.

If the set size index (index S), impact index (index I), and collision index (index C) are all set to "1" under the control of the processor 150, the host vehicle 10 may determine the peripheral situation of the host vehicle 10 through the sensor information collected in the driving path or predicted driving path of the host vehicle 10 (S16).

Then, the host vehicle 10 may calculate whether avoidance is possible or practical under the control of the processor 150 (S17). The host vehicle 10 may control to operate in the first avoidance mode or the second avoidance mode according to the calculated possibility of avoidance under the control of the processor 150.

The host vehicle 10 may determine that steering avoidance is possible or applicable if the risk of collision is low, and may control to operate in the first avoidance mode under the control of the processor 150. For example, in the first avoidance mode, the host vehicle 10 may set the avoidance index (Index A) to "0" under the control of the processor 150.

The host vehicle 10 under the control of the processor 150 may operate as a basic function that may not secure an additional deceleration quantity of the host vehicle 10 (S20) in the first avoidance mode (NO in S18).

On the other hand, the host vehicle 10 may determine that steering avoidance is impossible or inapplicable if a risk of collision is likely to occur and control to operate in the second avoidance mode (S19) under the control of the processor 150 (YES in S18). In other words, in the second avoidance mode, the host vehicle 10 may set the avoidance index (Index A) to "1" under the control of the processor 150.

In the second avoidance mode, the host vehicle 10 may operate it as an extended function capable of securing an additional deceleration quantity of the host vehicle 10 under the control of the processor 150. In this case, the maximum deceleration quantity may be increased by a predetermined rate. For example, in the first avoidance mode, the processor 150 may perform an extended function operation. The extended function operation may be increased to the maximum deceleration quantity by about 25% compared to the basic function operation.

The purpose of the present disclosure is providing an autonomous vehicle and a control method thereof capable of sensing properties of a long target and a cut-in situation through sensor signal, predicting a collision with a host vehicle based on the same, and performing brakes for avoiding collision.

Technical problems of the present disclosure are not limited to the above-mentioned technical problems, and other technical problems unmentioned will be clearly understood by those skilled in the art from the following description.

To resolve these issues, an autonomous vehicle according to the example of the present disclosure includes a processor, wherein the processor is configured to receive at least one sensor information from a plurality of sensors mounted on the host vehicle and analyze another vehicle traveling around the host vehicle based on the sensor information, set the other vehicle as a target vehicle if the other vehicle satisfies a predetermined target condition, determine an avoidance condition between the set target vehicle and the host vehicle, and control the autonomous vehicle to operate either in a first avoidance mode or in a second avoidance mode.

In at least one example of the present disclosure, the processor is further configured, in response to a length of the other vehicle being longer than a predetermined reference length and a width of the other vehicle being wider than a predetermined reference width, to determine that the target condition is satisfied and set the other vehicle as the target vehicle.

In at least one example of the present disclosure, the processor is further configured, if the target condition is satisfied, to calculate an impact point between the host vehicle and the target vehicle and to determine a collision type as a first collision type or a second type of collision based on the calculated impact point.

In at least one example of the present disclosure, the processor is further configured to determine the collision type as the first type of collision if the impact point which is determined by a collision point between the target vehicle and the host vehicle based on a X-axis is within a lateral collision determining range of the target vehicle.

In at least one example of the present disclosure, the processor is further configured to determine the collision type as the second type of collision if the impact point which is determined by a collision point between the target vehicle and the host vehicle based on a Y-axis is within the lateral collision determining range of the target vehicle.

In at least one example of the present disclosure, the processor is further configured to calculate a collision index between the host vehicle and the target vehicle and determine whether the target vehicle cuts-in based on the calculated collision index.

In at least one example of the present disclosure, the processor is further configured to determine that the target vehicle cuts-in if the calculated collision index is 1.

In at least one example of the present disclosure, the processor is further configured to determine that steering avoidance is possible if a collision is less likely to occur as a result of determining the avoidance condition and set the autonomous vehicle to the first avoidance mode or determine that steering avoidance is impossible if the collision is more likely to occur as the result of the determining of the avoidance condition and set the autonomous vehicle to the second avoidance mode.

In at least one example of the present disclosure, the processor is further configured to control the autonomous vehicle to operate with a basic function that may not use an additional deceleration quantity of the autonomous vehicle in response to the first avoidance mode.

In at least one example of the present disclosure, the processor is further configured to control the autonomous vehicle in an extended function capable of acquiring an additional deceleration quantity of the autonomous vehicle if the autonomous vehicle is determined as the second avoidance mode.

In accordance with another example of the present disclosure, a method of controlling an quantity of autonomous driving vehicles including a processor comprises receiving at least one sensor information from a plurality of sensors mounted in the host vehicle and analyzing another vehicle driving around the host vehicle based on the sensor information, setting the other vehicle as a target vehicle if the other vehicle satisfies a predetermined target condition, determining an avoidance condition between the set target vehicle and the host vehicle; and controlling the autonomous vehicle to operate in the first mode of avoidance or the second mode of avoidance.

In at least one example method of the present disclosure, the method further comprises, if a length of the other vehicle is longer than a reference length and a width of the other vehicle is wider than a reference width, determining that the target condition is satisfied and setting the other vehicle as the target vehicle.

In at least one example method of the present disclosure, the method further comprises, if the target condition is satisfied, setting a collision type to be either a first type of collision or a second type of collision based on a calculated impact point between the host vehicle and the target vehicle.

In at least one example method of the present disclosure, the method further comprises setting the collision type to be the first type of collision if the impact point which is determined by a collision point between the target vehicle and the host vehicle based on a X-axis is within a lateral collision determining range of the target vehicle.

In at least one example method of the present disclosure, the method further comprises setting the collision type to be the second type of collision if the impact point which is determined by a collision point between the target vehicle and the host vehicle based on a Y-axis is within the lateral collision determining range of the target vehicle.

In at least one example method of the present disclosure, the method further comprises determining a collision index between the host vehicle and the target vehicle and determining whether the target vehicle cuts-in based on the calculated collision index.

In at least one example method of the present disclosure, the method further comprises determining that the target vehicle cuts-in, if the calculated collision index as 1.

In at least one example method of the present disclosure, the method further comprises determining the first avoidance mode according to a result of determining that a steering avoidance is possible if a risk of collision is less likely to occur as a result of determining the avoidance condition, or the second avoidance mode according to a result of determining that steering avoidance is impossible if risk of collision likely to occur as a result of determining the avoidance condition.

In at least one example method of the present disclosure, the method further comprises operating in a basic function that may not acquire an additional deceleration quantity of the autonomous vehicle, in the first avoidance mode.

In at least one example method of the present disclosure, the method further comprises operating in an extended function capable of securing an additional deceleration quantity of the host vehicle, in the second avoidance mode.

The autonomous vehicle and the method for controlling the same according to the present disclosure configured as described above may improve the reliability of the autonomous vehicle by sensing the properties of a long target vehicle and the cut-in situation of the target vehicle based on the sensor signal, predicting the collision against the vehicle based on the sensor result, and performing the braking control for avoiding collision.

In addition or alternative, the autonomous vehicle and the control method thereof according to the present disclosure may determine a collision from a cut-in of a long target vehicle through information such as a size, an impact point, a time to collision, etc., with respect to the long target vehicle having a possibility of an emergency cut-in around a path where the autonomous vehicle travels, and perform braking for avoiding collision, thereby improving driver stability.

In addition or alternative, the autonomous vehicle and the control method thereof according to the present disclosure may determine a driving surrounding of the autonomous vehicle, and when determining that the situation is impossible to avoid steering, performs an extended braking control function for avoiding further collisions, thereby improving stability of the driver.

In addition or alternative, the autonomous vehicle and the method for controlling the same according to the example of the present disclosure may perform accurate control while reducing uncontrolled control and sensitive control by controlling based on a collision point at the time of cutting-in of a target vehicle having a long length.

In addition or alternative, the autonomous vehicle and the control method thereof according to the present disclosure may perform a more agile and accurate control of brakes in a scenario where an additional quantity of deceleration is used, through determining the situation around the front of the host vehicle.

In addition or alternative, the autonomous vehicle and the control method thereof according to the present disclosure may determine the cut-in of the long target vehicle and determine whether to operate in a basic or extended braking function by using a plurality of indexes, e.g., a calculation of target size, a calculation of collision point against the target, a calculation of collision time against the target, a calculation of steering avoidance available area, etc., thereby controlling the autonomous vehicle not to be sensitive if the autonomous vehicle is robust, which improves stability of the autonomous vehicle. The effects obtainable from the present disclosure are not limited to the above-mentioned effects, and other effects not mentioned will be clearly understood by those skilled in the art from the following description.

The one or more aspects of the present disclosure described above may be implemented as computer-readable codes in a medium in which a program is recorded. The computer-readable medium may include one or more types of recording devices in which data readable by a computer system is stored. Examples of the computer-readable medium include a hard disk drive (HDD), a solid state disk (SSD), a silicon disk drive (SDD), a ROM, a RAM, a CD-ROM, a magnetic tape, a floppy disk, an optical data storage device, etc.

Accordingly, the above detailed description should not be construed as being limited in all examples and should be considered as illustrative. The scope of the present disclosure should be determined by rational interpretation of the appended claims, and all changes within the equivalent scope of the present disclosure are included in the scope of the present invention.

What is claimed is:

1. An apparatus for controlling autonomous driving of a host vehicle, the apparatus comprising:
   a processor; and
   memory storing instructions that, when executed by the processor, cause the apparatus to:
      receive sensor information from at least one of a plurality of sensors mounted on the host vehicle;
      determine, based on the sensor information, whether another vehicle, traveling within a threshold distance from the host vehicle, satisfies a target condition;
      based on the other vehicle satisfying the target condition, set the other vehicle as a target vehicle and determine a collision type associated with the target vehicle, wherein the target vehicle is predicted to collide with the host vehicle at a time of a cut-in;
      determine an avoidance condition between the target vehicle and the host vehicle; and
      control, based on the avoidance condition, the autonomous driving of the host vehicle to operate in a first avoidance mode or in a second avoidance mode,
      wherein the instructions, when executed by the processor, cause the apparatus to determine the collision type by:
         setting a coordinate of a collision position by using coordinates of four vertices of the target vehicle with respect to the host vehicle;
         calculating an impact point having an X-axis component and a Y-axis component expressed as percentage values, based on the coordinate of the collision position; and
         determining, based on the X-axis component and the Y-axis component of the impact point, the collision type as one of a first collision type in which a front bumper of the host vehicle collides with a lateral side of the target vehicle and a second collision type in which the front bumper collides with a rear of the target vehicle.

2. The apparatus of claim 1, wherein the instructions, when executed by the processor, cause the apparatus to determine, based on a length of the other vehicle being longer than a reference length and based on a width of the other vehicle being wider than a reference width, that the target condition is satisfied.

3. The apparatus of claim 1, wherein the instructions, when executed by the processor, cause the apparatus to determine the collision type as the first collision type based on the Y-axis component of the impact point being greater than 0%.

4. The apparatus of claim 1, wherein the instructions, when executed by the processor, cause the apparatus to determine the collision type as the second collision type based on the Y-axis component of the impact point being 0%.

5. The apparatus of claim 1, wherein the instructions, when executed by the processor, cause the apparatus to:
    calculate a collision index between the host vehicle and the target vehicle, wherein the collision index indicates a likelihood of a collision between the host vehicle and the target vehicle; and
    determine, based on the calculated collision index, whether the collision is more likely to occur.

6. The apparatus of claim 5, wherein the instructions, when executed by the processor, cause the apparatus to determine that the collision is more likely to occur based on the calculated collision index being 1.

7. The apparatus of claim 1, wherein the instructions, when executed by the processor, cause the apparatus to:
    determine that avoidance of a collision between the host vehicle and the target vehicle by steering is applicable based on the collision being less likely to occur, and set the autonomous driving of the host vehicle to the first avoidance mode based on the avoidance of the collision by the steering being applicable; or
    determine that the avoidance of the collision by the steering is inapplicable based on the collision being more likely to occur, and set the autonomous driving of the host vehicle to the second avoidance mode based on the avoidance of the collision by the steering being inapplicable.

8. The apparatus of claim 1, wherein the instructions, when executed by the processor, cause the apparatus to control, based on the first avoidance mode, the autonomous driving of the host vehicle to operate according to a basic function that does not require an additional deceleration quantity of the autonomous driving of the host vehicle.

9. The apparatus of claim 1, wherein the instructions, when executed by the processor, cause the apparatus to control, based on the second avoidance mode, the autonomous driving of the host vehicle to operate according to an extended function capable of acquiring an additional deceleration quantity of the host vehicle.

10. A method performed by a processor for controlling autonomous driving of a host vehicle, the method comprising:
    receiving sensor information from at least one of a plurality of sensors mounted in the host vehicle;
    determining, based on the sensor information, whether another vehicle, driving within a threshold distance from the host vehicle, satisfies a target condition;
    based on the other vehicle satisfying the target condition, setting the other vehicle as a target vehicle and determining a collision type associated with the target vehicle, wherein the target vehicle is predicted to collide with the host vehicle at a time of a cut-in;
    determining an avoidance condition between the target vehicle and the host vehicle; and controlling, based on the avoidance condition, the autonomous driving of the vehicle to operate in a first avoidance mode or a second avoidance mode,
    wherein the determining the collision type comprises:
    setting a coordinate of a collision position by using coordinates of four vertices of the target vehicle with respect to the host vehicle;
    calculating an impact point having an X-axis component and a Y-axis component expressed as percentage values, based on the coordinate of the collision position; and
    determining, based on the X-axis component and the Y-axis component of the impact point, the collision type as one of a first collision type in which a front bumper of the host vehicle collides with a lateral side of the target vehicle and a second collision type in which the front bumper collides with a rear of the target vehicle.

11. The method of claim 10, further comprising:
    based on a length of the other vehicle being longer than a reference length and based on a width of the other vehicle being wider than a reference width, determining that the target condition is satisfied.

12. The method of claim 10, further comprising:
    setting the collision type as the first collision type based on the Y-axis component of the impact point being greater than 0%.

13. The method of claim 10, further comprising:
    setting the collision type as the second collision type based on the Y-axis component of the impact point being 0%.

14. The method of claim 10, further comprising:
    calculating a collision index between the host vehicle and the target vehicle, wherein the collision index indicates a likelihood of a collision between the host vehicle and the target vehicle; and
    determining, based on the calculated collision index, whether the collision is more likely to occur.

15. The method of claim 14, further comprising:
    determining that the collision is more likely to occur based on the calculated collision index being 1.

16. The method according to claim 10, further comprising:
    setting the autonomous driving of the host vehicle to:
    the first avoidance mode based on determining that avoidance of a collision between the host vehicle and the target vehicle by steering is applicable based on the collision being less likely to occur; or
    the second avoidance mode based on determining that the avoidance of the collision by the steering is inapplicable based on the collision being more likely to occur.

17. The method of claim 10, further comprising:
    controlling, based on the first avoidance mode, the autonomous driving of the host vehicle to operate according to a basic function that does not require an additional deceleration quantity of the host vehicle.

18. The method of claim 10, further comprising:
    controlling, based on the second avoidance mode, the autonomous driving of the host vehicle to operate according to an extended function capable of securing an additional deceleration quantity of the host vehicle.

19. The method of claim 10, wherein the determining whether the other vehicle satisfies the target condition comprises:
    determining, based on the sensor information, whether a size of the other vehicle satisfies a threshold size, and wherein the method further comprises:

changing a control time based on the impact point that is associated with vehicles satisfying the threshold size, wherein the impact point is different from a second reference point associated with vehicles not satisfying the threshold size.

20. The method of claim 19, wherein the reference point associated with vehicles not satisfying the threshold size is a rear center of the vehicles not satisfying the threshold size.

\*   \*   \*   \*   \*